(12) United States Patent
Dalgleish et al.

(10) Patent No.: US 7,940,444 B2
(45) Date of Patent: May 10, 2011

(54) METHOD AND APPARATUS FOR SYNCHRONOUS LASER BEAM SCANNING

(75) Inventors: Fraser Dalgleish, Vero Beach, FL (US); Frank M. Caimi, Vero Beach, FL (US); Glenn Stutz, Scottsdale, AZ (US)

(73) Assignee: Florida Atlantic University, Boca Raton, FL (US)

( * ) Notice: Subject to any disclaimer, the term of this patent is extended or adjusted under 35 U.S.C. 154(b) by 831 days.

(21) Appl. No.: 11/857,039

(22) Filed: Sep. 18, 2007

(65) Prior Publication Data
US 2008/0218821 A1 Sep. 11, 2008

Related U.S. Application Data

(60) Provisional application No. 60/845,684, filed on Sep. 19, 2006.

(51) Int. Cl.
*G02B 26/08* (2006.01)
(52) U.S. Cl. .................................................... 359/216.1
(58) Field of Classification Search .................. 359/368, 359/216.1, 217.1, 218.1; 250/234–236
See application file for complete search history.

(56) References Cited

U.S. PATENT DOCUMENTS

| | | | |
|---|---|---|---|
| 3,775,735 A | 11/1973 | Funk et al. | |
| 4,088,898 A | 5/1978 | Stitch | |
| 4,707,128 A | 11/1987 | Coles | |
| 5,046,259 A | 9/1991 | Tusting | |
| 5,418,608 A | 5/1995 | Caimi et al. | |
| 6,072,903 A | 6/2000 | Maki et al. | |
| 2006/0066944 A1* | 3/2006 | Okugawa | 359/368 |

OTHER PUBLICATIONS

Jaffe, J. et al., Underwater Optical Imaging: Status and Prospects, Oceanography, vol. 14, No. 3, 2001 pp. 66-76.
Dalgleish, F. et al, An AUV-deployable pulsed laser line scan (PLLS) imaging sensor, Ocean 2007 conference, Oct. 2-5, 2007, Vancouver, BC, Canada.
Jaffe, J., Performance bounds on synchronous laser line scan systems, Optical Society of America, Optics Express, vol. 13, No. 3, Feb. 7, 2005, pp. 738-748.
Kulp, T. et al., Development and testing of a synchronous-scanning underwater imaging system capable of rapid two-dimensional frame imaging, Applied Optics, vol. 32, No. 19, 1993, pp. 3520-3532.
Mullen, L. et al., Modulated laser line scanner for enhanced underwater imaging, Proceedings of SPIE, vol. 3761, Airborne and In-Water Underwater Imaging, editor Gary D. Gilbert, Oct. 1999, pp. 2-9.

* cited by examiner

*Primary Examiner* — Euncha P Cherry
(74) *Attorney, Agent, or Firm* — Ferdinand M. Romano, Esq.; Beusse, Wolter, Sanks, Mora & Maire, P.A.

(57) ABSTRACT

A scanner system. The system includes a mirror assembly having multiple reflective surfaces arranged to form one polygonal shape about an axis. A plurality of the multiple surfaces are each positionable to reflect radiation propagating from the source at a reflective angle and a position on the reflective surface to direct the radiation along a transmit path. When one reflective surface is so positioned, another surface is positioned to receive and reflect radiation along a detector signal path for processing. According to a related method for acquiring image data a mirror assembly is provided with multiple reflective surfaces sequentially arranged to form a polygonal shape about an axis. A beam of radiation is reflected from a first of the reflective surfaces and along a path in a first direction to a target region and a return signal propagates along the path in a second direction away from the target region. A portion of the return signal is reflected from a surface of a second of the reflective surfaces of the mirror assembly and along a path to a detector.

18 Claims, 6 Drawing Sheets

METHOD AND APPARATUS FOR SYNCHRONOUS LASER BEAM SCANNING

RELATED APPLICATION

This application claims priority to provisional U.S. patent application 60/845,684 filed Sep. 19, 2006 which is incorporated herein by reference in the entirety.

STATEMENT REGARDING FEDERALLY SPONSORED DEVELOPMENT

Development for this invention was supported in part by Award No. N00014-06-1-0113, awarded by the United States Office of Naval Research. Accordingly, the United States Government may have certain rights in this invention.

BACKGROUND OF THE INVENTION

1. Field of the Invention

This application relates generally to imaging systems and methods and, in particular, has application in characterization of surfaces, e.g., reflectance profiles, from remote positions wherein visibility may be range limited or otherwise obscured by, for example, light scattering effects or other phenomena which can limit transmission of optical data.

2. Description of the Prior Art

In both terrestrial and submarine environments there are situations in which the transmission of imaging data through the field of view is so limited that it becomes difficult to characterize surfaces with conventional systems such as, for example, a CCD-based imaging device and a divergent illumination source. One common limiting factor is the presence of a large number of suspended particles in the field of view. Not only does this result in significant back scattering of light, but it also contributes to transmission loss of imaging data. Typically, when the predominant component of energy received by the imaging device is attributable to scattered light, the signal-to-noise ratio is too low to provide useful information.

Several designs and configurations have emerged for underwater imaging applications at varied ranges. Conventional camera systems having an adjacent broad spectrum light source are useful for imaging surfaces at distances of one to two attenuation lengths. An attenuation length is the distance light must travel to be reduced to 1/e of its original intensity. It is typically 20 to 30 m in clear water. It has been found that at distances of about three attenuation lengths, acceptable imaging can be provided by spatially separating the light source from the camera, e.g., by using a flood light to illuminate the target region.

At imaging distances greater than three attenuation lengths, laser-based systems are more effective. These extended range imagers are generally of two classes: the synchronous laser line scanner (LLS) and the range gated scanner. See Jaffe, J. S. et al. "Underwater Optical Imaging: Status and Prospects", Oceanography, Vol. 14, No. 3 pp. 66-76 (2001). See, also, U.S. Pat. Nos. 4,707,128 and 5,418,608 each of which is incorporated herein by reference. These types of imaging systems can provide acceptable real-time image data in the range of 3 to 7 attenuation lengths. Such imagers have been under continued development for use in Autonomous Underwater Vehicles (AUVs) and Remotely Operated underwater Vehicles (ROVs) to provide surface information needed for navigation as well as for characterizing the sea floor for varied activities including military missions and construction of oil and gas infrastructures.

Synchronous LLS systems provide scanning capability with a continuous wave (CW) laser source. Based on results of controlled experimentation and analytical modeling, synchronous scanners have been found capable of operation at maximum distances of about 5 to 6 attenuation lengths. Further improvement in imaging range would benefit undersea operations by allowing increased vehicle speed and maneuverability and improved image resolution at greater distances from target regions. By way of example, in the exploration of unknown or dynamic environments, rapid topographical seabed variations can occur at rates greater than the vertical axis performance of the AUV. It is therefore necessary to distance the vehicle at a sufficient range above the seabed to avoid potentially catastrophic collisions. Optimal underwater optical scanner designs must consider this AUV trajectory.

The ability to more rapidly produce higher resolution images of targets and survey sites from greater distances will enable a more extensive and diverse set of applications for underwater vehicles. Depending on the size and complexity of surfaces in the target region, optical sensing may be the only effective means for characterizing features.

It has also been shown by both simulation and experimentation that the class of range-gated imagers i.e., those imagers utilizing a pulsed laser source, may be capable of adequate underwater performance for imaging target regions at distances up to seven attenuation lengths. These systems minimize introduction of energy due to scattered light with gating electronics. Although these imagers ultimately become power (or photon)-limited due to the exponential decay rate of light traveling through the water, they can be more compact than CW LLS systems because a spatial offset between the source and receiver is not required to reject scattered light.

Summarily, both classes of extended range underwater imagers ultimately are limited in range by the cumulative effects of forward scattering events and divergence of the illumination, particularly as the reflected signal travels from the target region to the imaging system. Scattering causes losses in contrast, resolution and signal to noise ratio (SNR). These losses are particularly problematic at and near the range limit of operation.

Relatively small depth of field (DOF) has also been a disadvantage in prior LLS system designs. This is particularly problematic when imaging in a dynamic undersea environment in which there is significant variation of optical transmission properties or in sea bed surface features or in which there is significant variation in platform altitude or attitude. With a small DOF each of these factors can lead to unacceptable degradation in image quality or complete signal loss. The DOF is a function of the source-receiver separation distance, the optical path length to and from the target, beam divergence and the acceptance angle of the receiver. The receiving aperture of the LLS system may be widened to improve DOF. Alternately, a fine adjustment of the optical focus may be slaved in accord with an on-board altimeter.

Range-gated imagers have also had inherent disadvantages in addition to limitations in imaging distance. For example, variations in distance between the system and a target surface result in a change in the required delay time of the gating function used to selectively acquire photons returning from the target.

Based on the foregoing it is apparent that both classes of extended range imagers have performance limitations restricting usefulness in a variety of potential applications including, for example, smoke-filled environments, fog, adverse weather conditions and underwater imaging. In addition, the size, weight and power requirements are also extremely important when designing an imager for portable or mobile deployment in any of the afore-described environments.

The optical resolution achievable with a LLS system is dependent on the laser beam diameter at the reflecting surface in the target region, and is also dependent upon the precision with which the receiver can resolve intensity information from the return signal as a function of the scan angle. Minimizing the instantaneous field of view (IFOV), e.g., by minimizing the spot size at the target, reduces the scattering volume, which reduction can improve the signal-to-noise ratio. That is, the imaging range of the system can be improved by reducing the size of the scattering volume. Reducing the IFOV reduces the target area per pixel, commonly measured in $cm^2$ per pixel and, theoretically, improves image resolution. This is particularly desirable when imaging target surfaces having a high spatial frequency, as the combined effects of forward scattering and blurring, due to the limited DOF, further limit the achievable resolution.

SUMMARY OF THE INVENTION

In accord with one example embodiment of the invention, there is provided a scanner system of the type which receives an optical signal based on radiation propagating along a path including a transmit path. The transmit path extends from a radiation source and extends toward a region to be characterized and a detector signal path extends from a target surface in the region to be characterized. The system includes a mirror assembly having multiple reflective surfaces arranged to form one polygonal shape about an axis. A plurality of the multiple surfaces are each positionable to reflect radiation propagating from the source at a reflective angle and a position on the reflective surface to direct the radiation along the transmit path. When one reflective surface is positioned to so reflect radiation along the transmit path, another surface is positioned to receive and reflect radiation along the detector signal path for processing.

An embodiment of a method for acquiring image data includes providing a mirror assembly having multiple reflective surfaces sequentially arranged to form a polygonal shape about an axis. The beam of radiation is reflected from a first of the reflective surfaces and along a path in a first direction to a target region and a return signal propagates along the path in a second direction away from the target region. A portion of the return signal is reflected from a surface of a second of the reflective surfaces of the mirror assembly and along a path to a detector.

BRIEF DESCRIPTION OF THE DRAWINGS

Features of the invention will be best understood when the following detailed description is read in conjunction with the accompanying drawings wherein.

Like reference numbers are used throughout the figures to denote like components. Numerous components are illustrated schematically, it being understood that various connections and components of an apparent nature are not shown in order to emphasize features of the invention.

DETAILED DESCRIPTION OF THE INVENTION

While the invention may be applied to a wide variety of remote sensing and imaging applications, the exemplary embodiments now illustrated are described in the context of underwater imaging, including that useful for acquiring high quality intensity images through turbid water from underwater vehicles, including AUVs.

Figure 1:
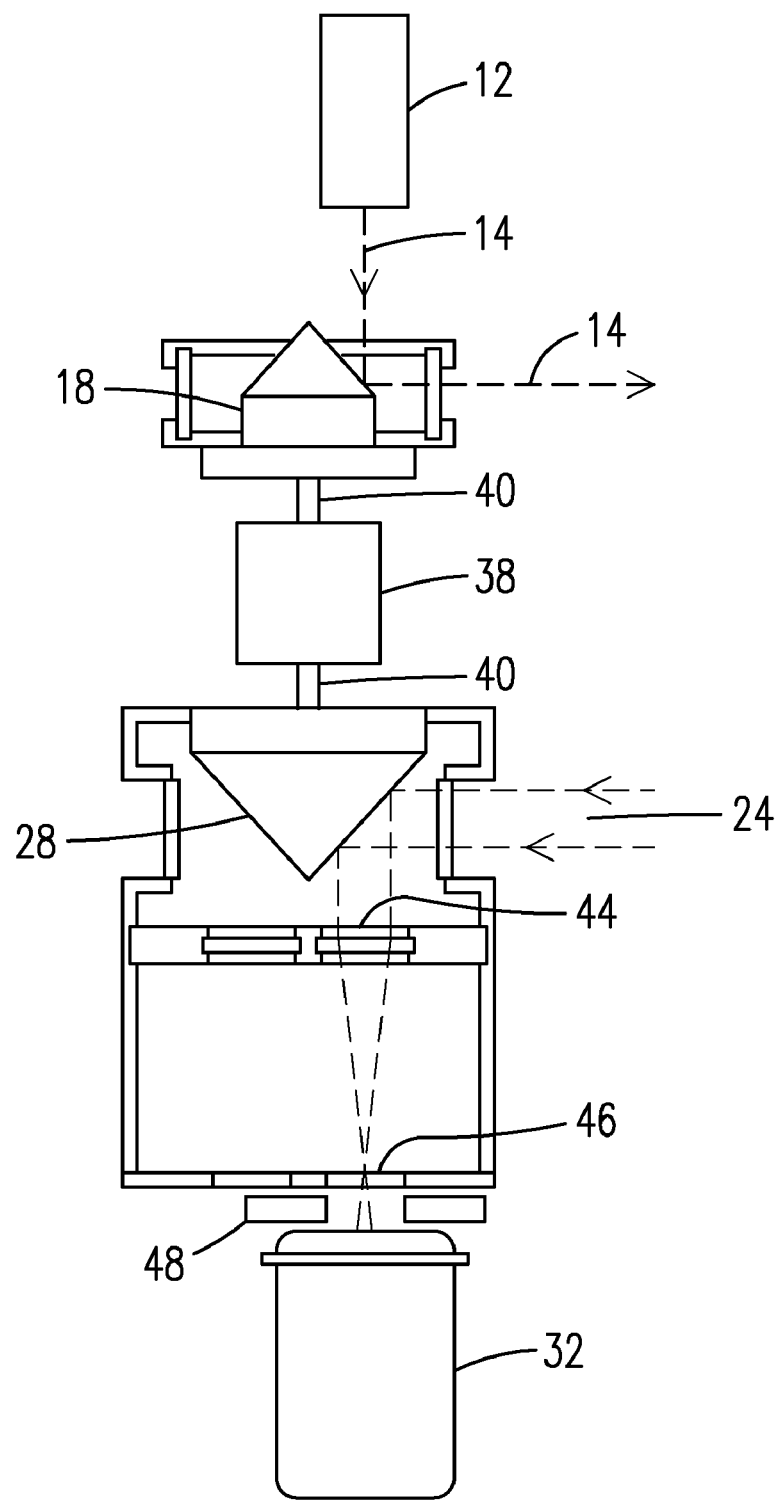
FIG. 1 schematically illustrates a prior known design for a laser light scanning system.

FIG. 1 illustrates a prior known laser light scanning system. A laser 12 provides a coherent radiation beam 14 to a first rotatable mirror assembly 18 to direct the beam 14 to a target region (not shown). A portion 24 of the beam 14 is reflected back from the target region and is received by a second rotatable mirror assembly 28 from which it is directed to a photomultiplier tube 32. The two mirror assemblies are synchronously coupled along a common axis about which they are each symmetrically aligned. The common axis is coincident with shafts 40 coupling each assembly to a scan motor system 38 which rotatably drives the assemblies. The mirror assemblies may, as illustrated, be, for example, tetrahedrons having four plane mirror faces or facets which are triangular and which each extend to an apex. As the assembly 18 rotates, the beam 14 incident on a mirror face thereof is reflected at a variable angle that generates a scanning line in space. Thus, for each revolution of the first assembly 18, four scan cycles are generated over a predetermined scan angle.

Reflections created in the target region by the scanning beam form the beam portion 24 which is collected from a series of scanning reflections across the rotating faces of the second assembly 28 and condensing optics (e.g., a lens 44, a rotating field stop 46 and an adjustable, but fixed, field stop 48) for input to the photomultiplier tube 32. The system of FIG. 1 may include other common components such as cylindrical correction lenses in order to improve optical throughput.

In the system of FIG. 1 the curvatures of the output scan field of the assembly 18 and the receive scan field of the assembly 28 are in the opposite direction. This requires an undesirably large receiver field of view in the assembly 28 in order to capture the laser light as it scans across the reflective faces of the assembly 28. Furthermore to accommodate the resulting beam walk effect over the sensitive area of the PMT, the PMT requires a large photocathode. Such devices are not optimal in terms of noise and performance. In addition, to optimize the system Field of View (FOV) and therefore reduce the amount of scattered light entering the receive channel, the system should not impart curvature to either scan track. In the alternative, the first and second assemblies should provide the same curvature or no curvature.

The attenuation length is the inverse of the optical attenuation coefficient which is a characteristic of the medium, e.g., water, through which the laser radiation propagates. LLS systems typically have a limited range of operation because, at five to seven attenuation lengths, the intensity of received scattered light approaches or exceeds the intensity of received attenuated light reflected from the target region. Attenuation of the signal generally follows an exponential decay of the form exp(−2CD) with D being the distance traveled along the light path and C being the optical attenuation coefficient of the transmission medium. The attenuation coefficient is typically about 0.2/m for coastal waters, about 0.5/m for estuarine waters and about 1.0/m for turbid harbor waters. Thus five attenuation lengths is about 25 meters in coastal conditions, about 10 meters in estuarine waters and about five meters in turbid waters. The limited optical range of scanning imagers in turbid waters constrains the speed and maneuverability with which AUVs can traverse underwater environments. More generally, it is desirable to improve the distances at which remote sensing and imaging of features can be performed.

Figure 2A:
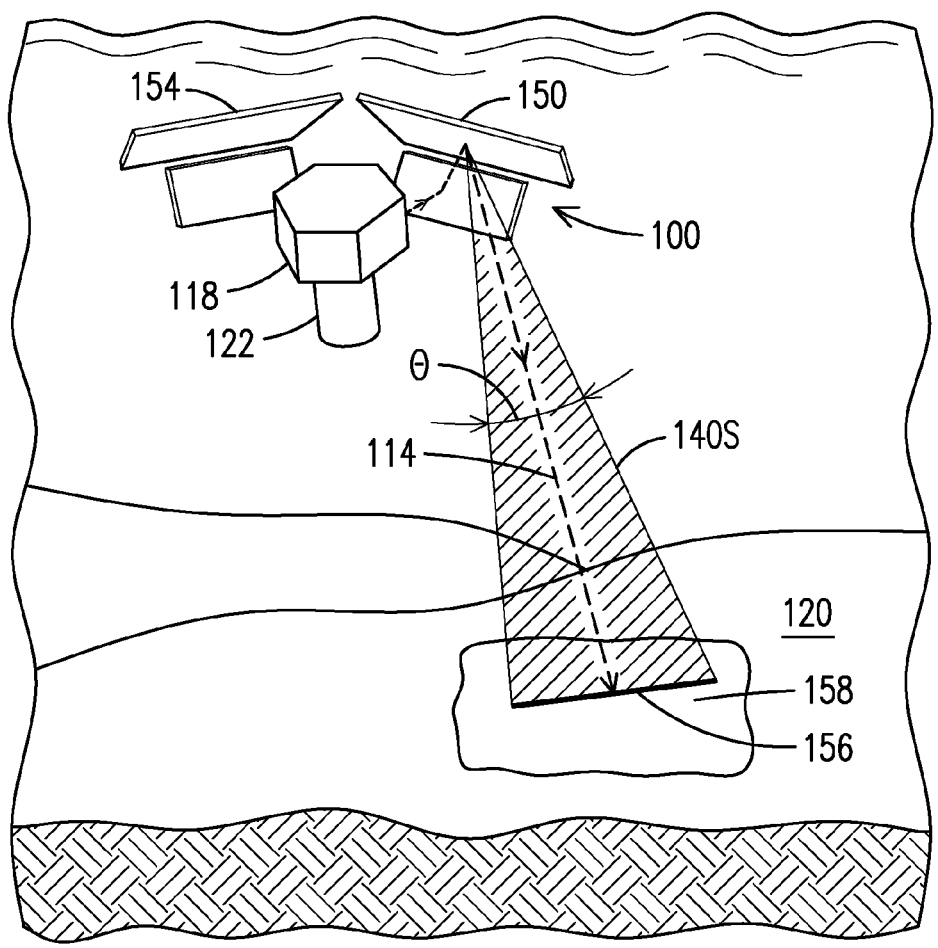
FIGS. 2A and 2B are partial perspective views illustrating operation of a system according to the invention.
Figure 2B:
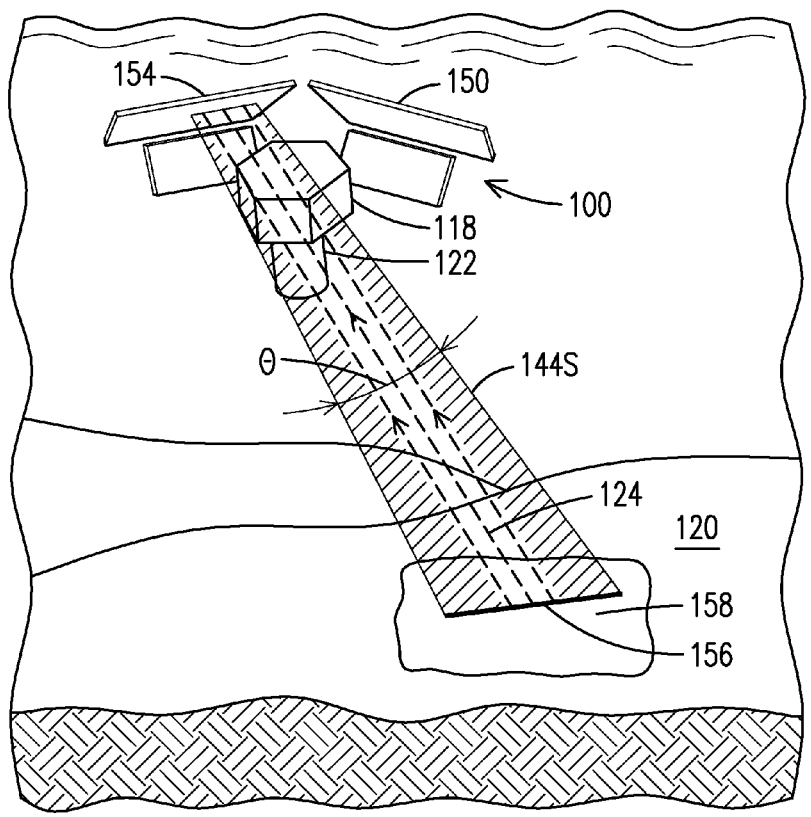
Figure 3:
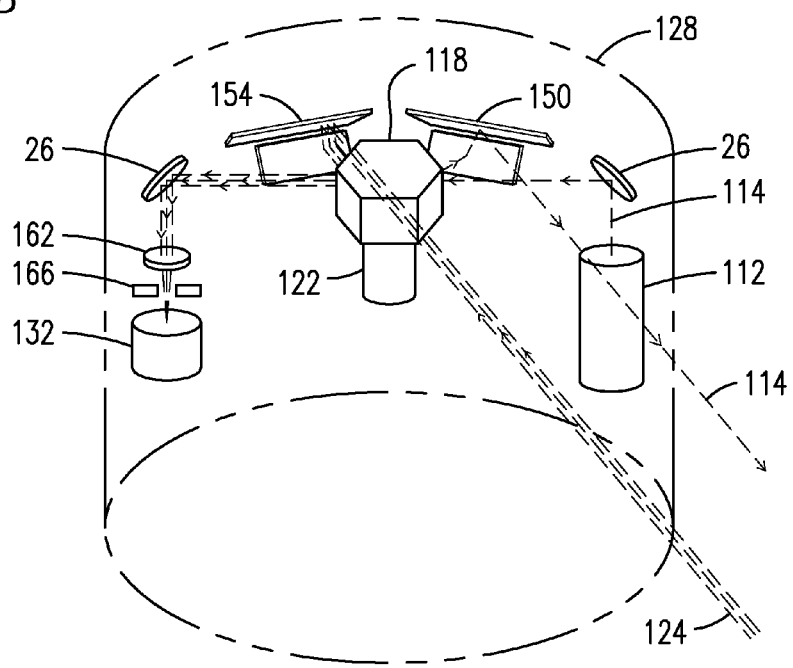
FIG. 3 is another partial perspective view, in schematic form, of the system shown in FIG. 2.

The partial perspective views of FIGS. 2 and 3, and the partial schematic view of FIG. 4 illustrate a laser light scanning system 100 according to one embodiment of the invention. The system 100 may be deployed for imaging or remote sensing in environments subject to optical interference, such as that generated by turbulence, particulate matter or other phenomena that influence the signal-to-noise ratio, e.g., scattering. Generally, a laser source 112 provides a coherent radiation beam 114 to a single rotatable mirror assembly 118 whose motion continually deflects the beam 114 to generate a scanning pattern with which the beam 114 passes along a portion of the target region 120. The mirror assembly 118 is coupled to a motor drive system 122 for rotation at steady state speeds in the range of 1000 to 4000 rpm, although higher or lower rotational speeds may be selected based on required performance criteria, within the prevailing environmental and operational conditions.

The assembly 118 also receives a reflected portion of the beam 114, referred to herein as the signal 124, from the target region 120 as the beam 114 scans a surface in the target region. As now described in greater detail, this scanning across a surface in the target region 120 and reflection of the beam signal 124 back to the assembly 118 may be effected with outgoing beam steering optics and incoming signal steering optics. To illustrate features of the invention illustrations of the outgoing beam steering optics and incoming signal steering optics may not be to scale. The system 100 may also incorporate folding mirrors 26 to facilitate positioning of components to achieve a more compact configuration for deployment in a housing 128 such as schematically indicated in FIG. 3. With such a housing the outgoing beam 114 and the returning signal 124 may pass through an optical port 130 as shown in FIG. 4. The port 130 accommodates a scan angle θ through which the beam 114 and signal 124 move.

Figure 4A:
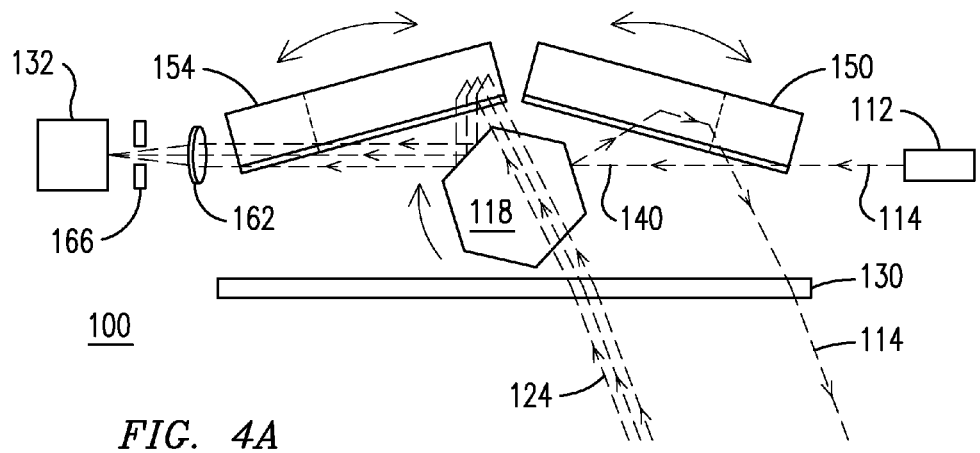
FIGS. 4A, 4B and 4C provide a sequence of plan views further illustrating features of the system shown in FIGS. 2 and 3.
Figure 4B:
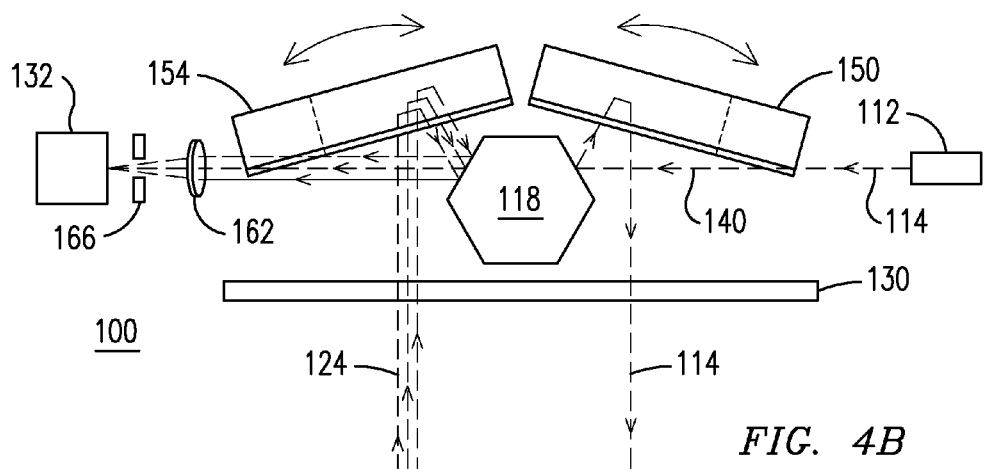
Figure 4C:
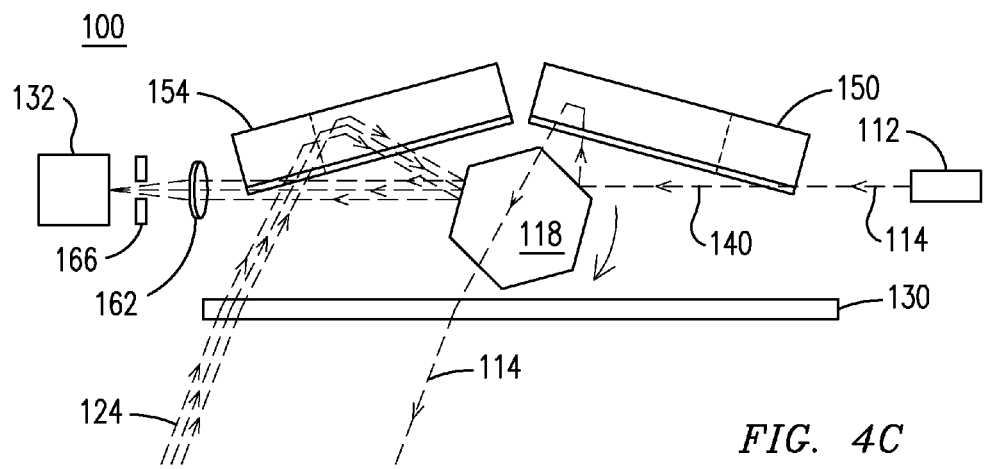

The mirror assembly 118 simultaneously directs the outgoing beam 114 and the returning beam signal 124, via a series of reflections along surfaces thereof, to (i) scan the beam 114 through the angle θ and to the target region, and (ii) guide the received beam signal 124 through an optical stage for input to a photomultiplier tube 132 which effects conversion into electrical signals for creation and display of image data. As generally indicated in FIGS. 2A, 3 and 4, the system 100 generates an outgoing scanning transmission path 140, across which the beam 114 is scanned and along which the beam 114 propagates. The path 140 extends from the source 112 to the target region 120 being imaged. The portion 140F of the transmission path 140 which extends from the source 112 to the assembly 118 is spatially fixed relative to the source and other non-moving components in the system 100. That is, the portion 140F follows a fixed, non-scanning line relative to the source 112 and other non-moving components of the system 100. The portion of the transmission path 140 which extends from the assembly 118 to the target region 120 is the non-fixed, scanning portion 140S of the transmission path 140, which subtends an angle θ that may be on the order of 70 degrees. FIGS. 4A, 4B and 4C illustrate three exemplary sub-paths 140A, 140B and 140C, in the scanning portion 140S of the path 140 as the beam 114 scans across the angle θ.

Figure 8:
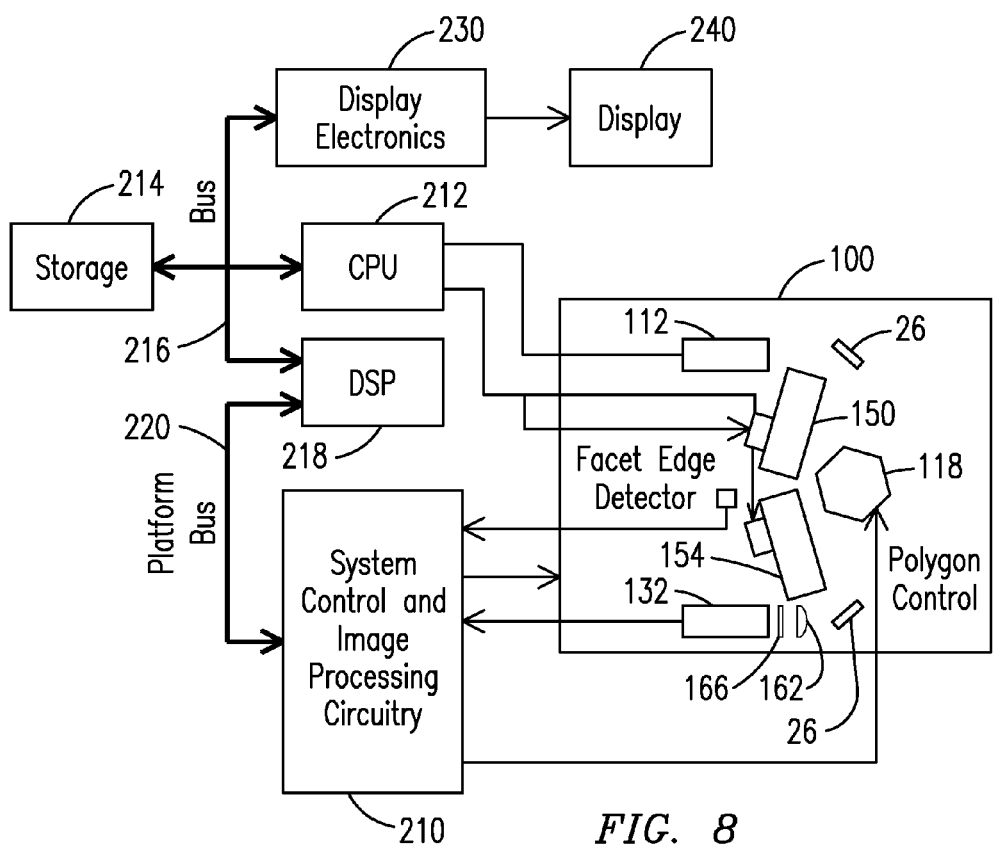
FIG. 8 schematically illustrates components of the system described in FIGS. 2-7.

As generally indicated in FIG. 2B, in response to propagation of the beam 114 along the scanning portion 140S of the outgoing path, the system 100 receives the reflected scanning beam signal 124, which travels along an incoming scanning detector signal path 144 and propagates to a detector stage which includes focusing optics 162, a variable aperture or stop 166 and an electro-optic sensor. In the illustrated example the photomultiplier tube 132 is the electro-optic sensor, which may, as illustrated in FIG. 8 be connected to circuitry for generating and processing electrical signals based on optical signals received from the target region.

With the detector signal path 144 extending from the target region 120 to the photomultiplier tube 132, the portion 144S of the detector signal path which extends from the target region 120 to the assembly 118 is the scanning portion of the detector signal path 144 which also subtends the angle θ. The portion 144F of the detector signal path 144 is the non-scanning portion of the detector signal path 144 which is spatially fixed relative to the photomultiuplier tube 132 and other non-moving components of the system 100. Along the portion 144F of the path 144 the beam signal 124 propagates in a fixed, non-scanning line as it enters the photomultiplier tube 132. See, again, FIGS. 4A, 4B and 4C which also sequentially illustrate three exemplary sub-paths 144A, 144B and 144C in the scanning portion 144S of the path 144, i.e., as the signal 124 scans through the angle θ.

The beam 114, propagating from the source 112 along the transmission path 140, is first directed to the mirror assembly 118 from which it is reflected to outgoing beam steering optics 150. Rotation of the assembly 118 while the beam 114 is being reflected therefrom scans the beam 114 multiple times per revolution of the assembly. Scanning of the beam 114 results in a series of propagation paths, forming a scan line across the scanning portion 144S of the outgoing transmission path 140, along which the beam 114 sequentially travels. Consequently the beam 114 is scanned across a portion of the target region 120. With reference to FIG. 2, the exemplary scan line 156 shown along a surface 158 in the target region 120 corresponds to a scan line along which the beam 114 passes as the system performs a scan through the angle θ. To the extent the target region 120 includes suitable reflective surfaces, portions of the scanning radiation which impinge thereon reflect radiation data signals 124 that propagate along the incoming detector signal path 144 to incoming signal steering optics 154. The data signals sequentially propagate from a scan line 156 in a series of propagation paths extending across the detector signal path 144, along which the beam signal 124 sequentially travels to the assembly 118. The scanning portion 144S of the signal path 144 also subtends the angle θ across which there is a series of propagation paths for the scanning signals 124 to pass.

Thus rotation of the single assembly 118 transforms propagation of the beam 114 from a fixed path 140F into an outgoing scanning portion 140S of the transmission path 140. This in turn generates a series of beam signals 124 as reflections are generated along a scan line 156, e.g., on the surface 158, in the target region. The signals 124 extend through an angle θ across the scanning portion 144S of the incoming detector signal path 144. See, also, FIG. 5. In accord with the illustrated embodiment, reflective faces 180 on the rotating assembly 118 each receive a series of beam signals 124 corresponding to one series of reflections generated from the surface 158 each time the beam 114 sweeps through the scan line 156.

Upon reflection of the scanning beam signal 124 from a face 180 the path of signal propagation is transformed from a temporally varying scanning path to propagation over the non-scanning portion 144F of the detector signal path 144. The transformation from the scanning portion 144S to the non-scanning, fixed portion 144F of the path 144 is effected by providing constancy in the angle of incidence at which each reflective face 180 receives the scanning beam signal 124 while the faces 180 rotate with the assembly 118. With the reflective faces rotating at a given angular velocity, the period of each scan line along the path portions 140S and 144S is equal to the period during which each reflective face receives the beam signal 124. With this constancy there is also a constancy in the angles of incidence and reflection of the beam signal 124 striking each face 180. As a result, the path along which the signal 124 propagates to the photomultiplier tube 132 is transformed from a scanning path to the fixed path portion 144F. This and other references made to changes from a scanning path to a fixed path such as the scanning portion 144F are relative. The spatially fixed path portion 144F is relatively fixed compared to the scanning path portion. That is, the signal 124 may exhibit some spatial variation such as that referred to as beam walk.

The exemplary mirror assembly 118 is in the shape of a regular hexagonal prism, having six rectangular reflective faces 180, e.g., mirrored surfaces configured as outer surfaces of the prism, that are rotatable about a central axis A. Each face 180 is in a plane that is parallel with the axis A. In the example embodiment the fixed path 140F is in a plane orthogonal to the axis A, referred to herein as the scanning transform plane ST. Rotation of each face 180 along which the beam 114 impinges results in a sweep within the plane ST. Rotation of each face 180 along which the beam signal 124 impinges results in a sweep of the beam signal 124 along a face 180 and in the plane ST. Although the illustrated assembly is in the shape of a regular polygon having an even number of faces, assemblies having similar functions to the assembly 118 may be formed with other multifaceted shapes and geometries. With the beam 114 directed to the hexagonal shaped assembly 118 spinning at about 1000 to 4000 RPM, the resulting scan rate is about 100 to 400 lines per second.

Figure 5:
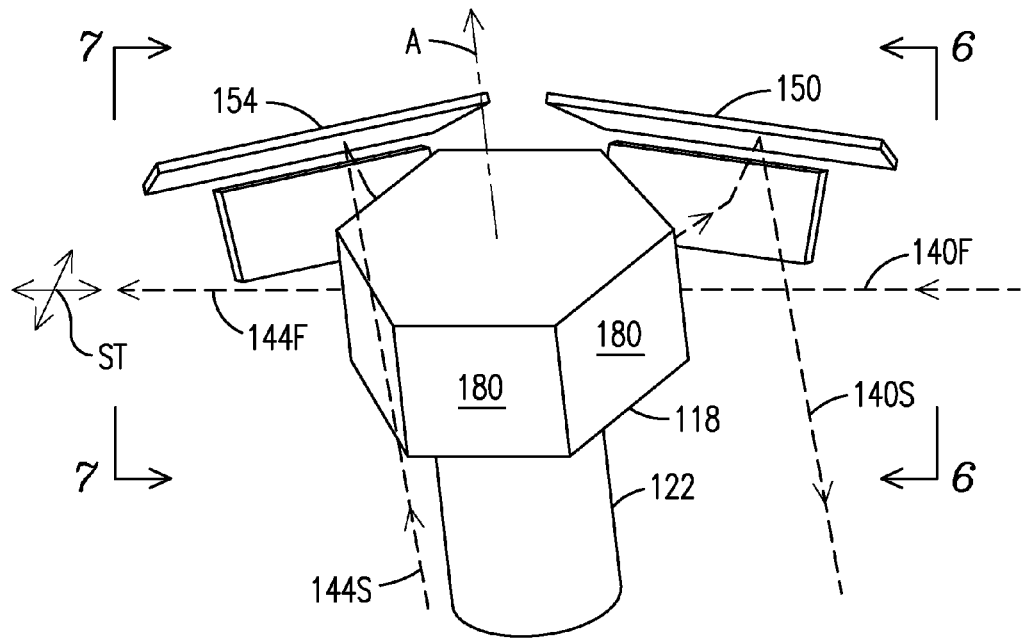
FIG. 5 is a partial perspective view of select components in system shown in FIGS. 2, 3 and 4.

With reference to FIG. 5, when the target region is relatively distant from the assembly 118, at positions relatively close to the assembly 118 the illustrated portion of the path 140S, between the outgoing beam steering optics 150 and the target region 120, is approximately parallel with the illustrated portion of the path 144S between the incoming signal steering optics 154 and the target region 120. With the assembly 118 rotating about the axis A, at any given time the beam 114 and the beam signal 124 are both in the plane ST and are each incident on a different one of the reflective faces 180 of the assembly 118. This results in a synchronized temporal variation in the angles of incidence and reflection of the beam 114 along one face 180 and of the beam signal 124 along another face 180. Accordingly, propagation of the beam 114 is transformed from a fixed path beam into a scanning beam (resulting in the scanning path portions 140S and 144S), and propagation of the beam signal 124 is transformed from a scanning path beam into a fixed position beam signal (resulting in the fixed path portion 144F).

As a result, the system 100 simultaneously transforms the beam 114 into a scanning beam and transforms the scanning beam signal 124 into a non-scanning beam signal. The assembly 118 simultaneously transforms the fixed path portion 140F to the scanning path portion 140S and the scanning path portion 144S to the fixed path portion 144F. In this way, the illustrated scan architecture substantially reduces the beam walk relative to that inherent in previously developed systems, making it possible to use a small photocathode photomultiplier tube as the receiver. For each revolution of the assembly 118, two sets of cycles are generated in synchrony. Six cycles are generated with the outgoing beam 114 to provide six scan lines 156, and six cycles are also generated to transform six scans of the incoming signal 124 into a non-scanning signal. Each outgoing beam cycle is in synchrony with one cycle that transforms an incoming scan. Each scan cycle extends over a predetermined scan angle which, in the illustrated example, is the same angle θ for each face 180. Consequently the scan angle θ subtended by the scanning portion 140S of the outgoing beam path 140 is substantially the same as or identical to the angle subtended by the scanning portion 144S of the incoming signal path 144.

Figure 6:
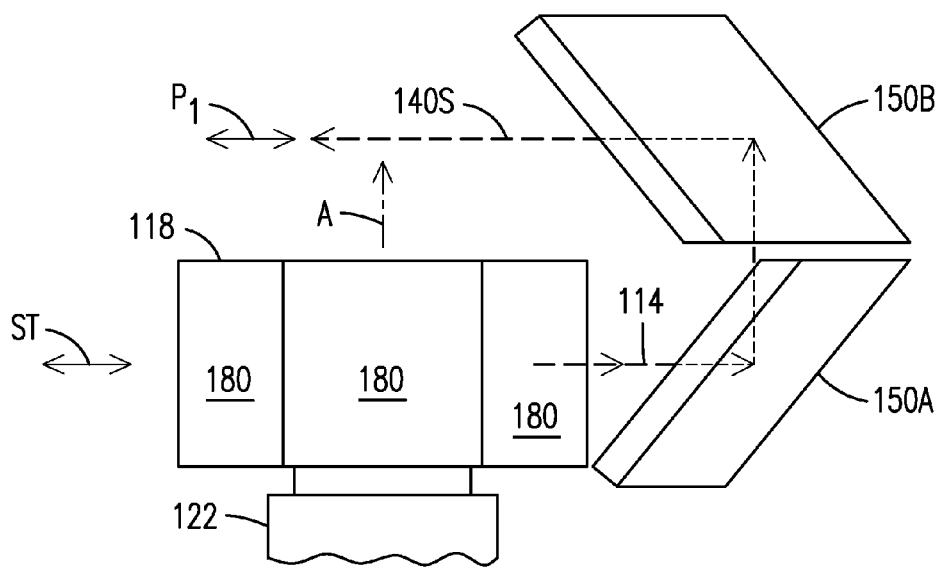
FIG. 6 is a side view of components shown in FIG. 5 taken along line 6-6 of FIG. 5.
Figure 7:
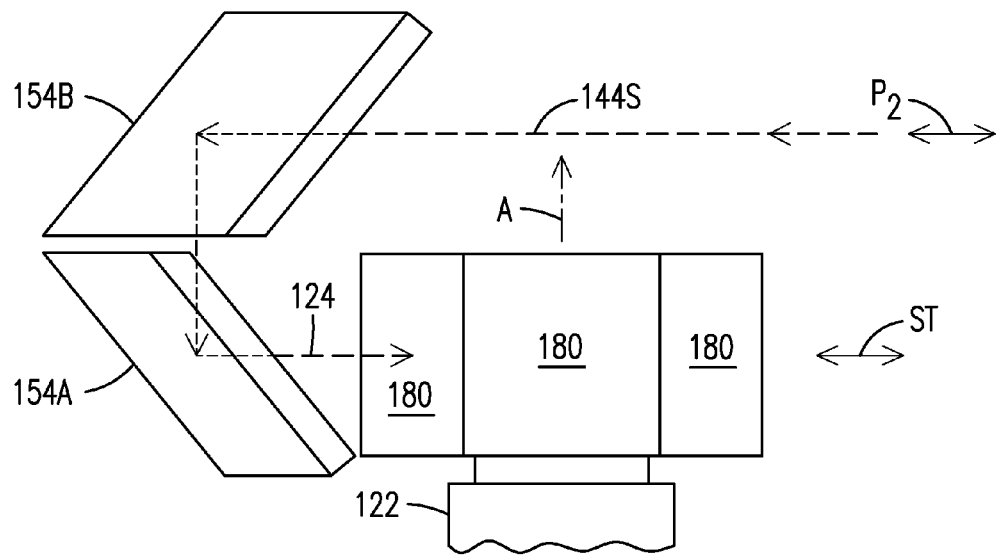
FIG. 7 is a side view of components shown in FIG. 5 taken along line 7-7 of FIG. 5.

FIG. 5, a partial perspective view of the system 100, illustrates paths followed by the beam 114 and the signal 124 among the mirror assembly 118, the outgoing steering optics 150 and the incoming steering optics 154. FIGS. 6 and 7 provide partial views of the scanning portions 140S and 144S of the beam and signal paths, being directed in or out of the plane ST. As shown in FIG. 6, the outgoing steering optics 150 comprises lower and upper outgoing steering mirrors 150A, 150B, cooperatively positioned to reflect and thereby displace the scanning portion 140S of the path 140 out of the plane ST. Photons in the beam 114 are initially deflected from a face 180 on the polygonal assembly 118 to the lower outgoing steering mirror 150A from which they are deflected to the upper outgoing steering mirror 150B and then reflected at an appropriate angle to be directed over the top of the assembly 118 such that the scanning portion 140S of the path 140 travels along a plane P1 and through the optical port 130 to the target region 120.

As shown in FIG. 7, the incoming steering optics 154 comprises lower and upper incoming steering mirrors 154A, 154B, cooperatively positioned to reflect and thereby displace the scanning portion 144S of the path 140 out of a plane P2. Photons in the signal 124 initially pass through the optical port 130 and strike a surface of the upper incoming steering mirror 154B from which they are deflected at an appropriate angle of incidence into the lower incoming steering mirror 154A in order to then be reflected from the mirror 154A into a path along the plane ST to a face 180 on the polygonal assembly 118. In the illustrated example the plane P1 and the plane P2 are the same plane which is parallel to the plane ST. In other embodiments the planes P1 and P2 may differ and may each be parallel to the plane ST or may each have a different orientation with respect to one another or to the plane ST. Each of the mirror assemblies 150 and 154 is rotatable to shift the direction of the scanning portions 140S and 144S of the outgoing and incoming paths within the plane ST. This degree of freedom enables movement of the scan line 156 to select different target regions from which image information is to be acquired.

FIG. 8 generally illustrates additional components of the system 100 to effect operation. System control and preprocessing imaging circuitry are resident on one or more control boards 210. The system architecture includes a conventional microprocessor 212, and storage media 214 operating on a PCI Bus 216. A DSP 218 interfaces with the CPU 212 through the Bus 216 and interfaces with the control board 210 via a platform bus 220. The board 210 controls operation of the motor system 122, including selection of appropriate rotational speed. For example, the motor control may be slaved to the speed at which the AUV traverses over a target region so that higher scan rates are provided at higher speeds. Processing circuitry, including A/D conversion of electrical signals received from the photo-multiplier tube 132, provides signals which are further processed by electronics 230 for display 240 on a monitor 240 or provided to the storage media 214.

A synchronous scanning architecture has been illustrated which is more compact than prior designs. The disclosed system, employing a single rotatable prism for directing the outgoing beam and receiving an incoming signal, enables a reduction in separation distance between the outgoing beam and the incoming signal. In the past, such a reduced distance has been avoided because it is known to lead to increased noise from near-field back scattering events when using a CW laser source. However, designs in accord with the present invention provide (i) improved optical synchronicity which, in turn, enables a narrower receiver acceptance angle while maintaining a large scan angle θ, e.g., 70 degrees. With a lateral separation between the transmit and receive channels, the system performance exhibits greater immunity to platform pitching.

The disclosed design also minimizes or eliminates beam walk-off which occurs in other designs as the scanning beam traverses the full angular range. For the system 100 beam walk-off is an order of magnitude less than that of other imaging systems and this allows use of state-of-the-art fast, low-noise, high bandwidth detectors, e.g., a photomultiplier tube having a smaller aperture, thereby enabling a faster response time and an improved signal-to-noise ratio. For example, the system 100 can perform with a photomultiplier tube area on the order of about 50 mm, and consistently capture the same flux of focused photon energy over the entire angle subtended by the scan line. With a narrow aperture photodetector the system 100 provides a relatively fast response time and exhibits lower noise than systems incorporating photomultiplier tubes having larger photocathode areas. This enables use of pulsed or coded pulse laser sources.

The system 100 can provide a relatively small instantaneous field of view (IFOV) by minimizing the receiver spot size as the beam is reflected from the target region. Further, design of the rotating assembly 100 as a regular polygon provides increased precision with which the receiving optics tracks the return signal throughout the scan angle θ. The resulting minimization of the IFOV reduces the scattering volume which would otherwise further limit the imaging range.

The system 100 can accommodate a relatively small aperture photodetector without compromising the maximum achievable scan angle θ. With use of folding mirrors the system may be placed within a 21 inch diameter AUV.

A suitable source for the system 100 is low-noise hermetically sealed diode-pumped solid state Nd:YAG CW laser having an adjustable output power with a maximum output of about 3 W at 532 nm. When used with a collimator, the beam diameter is <2 mm with a far field beam divergence of <2 mrad.

A wide angle scan is attainable with the present invention despite the use of about a 1 mm field stop. In one embodiment an opening in the field stop is a prolate oval slit about 2.5 mm in length and about 0.2 mm in width.

In one embodiment of the AUV deployment, the focal length adjusting mirrors in the steering optics 150 and 154 are slaved to an AUV altimeter. The mirror pairs 150A, 150B and 154A, 154B on each side of the polygonal mirror assembly 118 can be rotated in tandem to change the focal depth. In an embodiment where each scan line has a length of about 10 m and the horizontal pixel resolution is 4000, each pixel is about 2.5 mm long. The detected signal is sampled for processing, as described below, at a maximum rate of about 4096 samples per scan line. When incorporated in an AUV, the through-axis resolution (i.e., resolution in the direction of travel) is determined by the speed of the vehicle over the imaged terrain.

In yet another embodiment, which can be incorporated in an AUV, the scanning system 100 uses a pulsed laser in lieu of the CW laser source, and a gated receiver to reduce reflected, scattered and ambient light. The glass of the optical port 130 and the baffle design can also be optimally shaped to reduce these effects.

In some embodiments according to the invention, the scanning system may not produce perfect correlation between pixels of the output and receive channels. The centers may be offset and tilted (to accommodate manufacturing tolerances) to coincide at a given focal depth. The receive collection cone can be widened to accept the output at all pixel positions.

The scanner of the present invention produces an IFOV as required to maintain optical synchronicity throughout an entire scan angle that is narrower than the IFOV of prior art scanners. This feature reduces the common volume (the region where the transmit and receive beams overlap), and hence the amount of scattered light reaching the receiver while the resulting images do not suffer significant contrast degradation relative to that of other imagers.

In prior designs of LLS systems, a reduction in separation distance between the outgoing beam and the received signal has been undesirable in that LLS imagers have required a source/receiver separation distance of about 0.4 m in order to limit noise from near-field back scattering events. Scanner systems according to the invention have substantially parallel beam entry and exit axes, with both beams reflected from a single rotating polygon that provides beam synchronocity. These systems permit use of a narrow detector with faster response, thereby permitting use of high frequency and modulated (i.e., pulse modulated) light sources. Scanners such as the system 100 can have a separation distance, e.g., measured at the optical port 130, between the outgoing beam and the received signal of about 28 cm or less, allowing smaller overall system form factors more suitable for mobile applications such as for use in AUVs.

Thus numerous embodiments according to the invention provide a synchronous scanning architecture that is relatively compact and which provides a relatively narrow IFOV over the entire angle subtended by the scan line, this being suitable for use with a photodetector having a smaller aperture smaller than used in prior art scanners, while the maximum achievable scan angle is not compromised.

The optical synchronicity between the beam 114 and the signal 124 enables a narrower receiver acceptance angle than that of other receivers, while still achieving a desired scan angle (e.g., a 70° scan angle). By laterally separating the transmit and receive channels, the system has greater immunity to any platform pitching experienced by an AUV when controlled by an altitude autopilot.

Since the scanning architectures according to the present invention permit use of smaller detectors, embodiments of the invention can be applied to control the temporal aspects of both source and receive channels or to modulate the transmitted laser pulse. The response time of the smaller detector is sufficient to detect such temporal changes in the received signal without compromising the maximum achievable scan angle.

The illustrated embodiments are useful for underwater imaging in turbid waters because precise control of the spatial characteristics of both source and receive channels, e.g., scanning beam 114 and beam signal 124 reduces image degradation which would otherwise occur due to excessive scattering by the turbid water medium. Similar performance benefits can also be realized when systems according to the invention are used to provide image information in fields of view that are filled with smoke or fog or other light-scattering media.

It is desired in some embodiments of the present invention to use a photodetector having a signal bandwidth in excess of 1 GHz. To satisfy this requirement with current photomultiplier tube technology, the photosensitive region (aperture) should be less than about 10 mm. The new scanning architecture of the present invention can achieve a 70 degree scan angle with only a 2.5 mm tracking across the receiver.

The use of pulsed or pulse-modulated signals (which can be detected by the smaller photodetector used in the present invention) and the fast gated receiver allows the shorter baseline configuration of the present invention. Thus the overall form factor of the scanning system of the present invention is smaller than the form factor of prior systems.

According to the illustrated embodiment, a scanning architecture comprises a single six-faceted polygonal scanning mirror and lens assembly that presents a narrow instantaneous field of view (IFOV) at the receiver, where the received laser signal is optically coincident with the transmitted laser pulse throughout the entire scan angle for a fixed stand-off distance. The IFOV is adjustable over a range of about 5-20 mrad over the scan axis and about 5 mrad in the direction of travel when carried in an AUV.

The invention further comprises a mechanism to maintain this optical synchronization as the stand-off distance changes. The symmetry of the source and receiver channels about the center axis of the polygonal scanner reduces the detector photocathode area required to receive photons through the entire full scan angle. The present scanning apparatus and method exhibits less pointing deviation between receive and transmit channels over the same angular scan range than the prior art scanning systems. Advantageously, therefore, the scanner of the present invention can utilize a smaller active area photodetector with a faster response time. In one embodiment the system of the present invention offers a significant reduction in detector area from about 50 mm diameter in the prior art to a diameter less than 3 mm).

While exemplary embodiments of the invention have been described, the invention is not so limited. Numerous modifications, changes, variations, substitutions and equivalents will be apparent to those skilled in the art without departing from the spirit and scope of the present invention as described in the claims. It is also noted that, to more clearly present features pertinent to the invention, numerous components have been expressly illustrated while other components may not have been illustrated. Further, in order to illustrate features of the invention, components and features illustrated in the figures may not be to scale. Accordingly, the invention is only limited by the claims which follow.

The claimed invention is:

1. A scanner system of the type which receives an optical signal based on radiation propagating along a path including a transmit path, which extends from a radiation source and extends toward a region to be characterized, and a detector signal path which extends from a target surface in the region to be characterized to a light detection device, comprising:
    a mirror assembly having multiple reflective surfaces arranged in different planes with respect to an axis to form one polygonal shape about the axis, a plurality of the multiple surfaces each positionable to reflect radiation propagating from the source at a reflective angle and a position on the reflective surface to direct the radiation along the transmit path wherein, when one reflective surface is positioned to so reflect radiation along the transmit path, another surface is positioned to receive and reflect radiation along the detector signal path for processing, wherein
    rotation of the mirror assembly scans radiation propagating along the transmit path so that radiation transmitted to the system from the target surface sequentially includes radiation reflected from multiple positions thereby generating a spatially varying path, which forms a portion of the detector signal path, at positions between the target surface and the assembly; and
    upon reflection of radiation propagating along the detector signal path from said another reflective surface of the assembly, the same rotation directs said reflected radiation along a relatively fixed path between said another reflective surface of the assembly and the detection device relative to the spatially varying path, which fixed path forms a portion of the detector signal path.

2. The system of claim 1 wherein the mirror assembly is rotatable about the axis.

3. The system of claim 2 wherein rotation of the assembly varies the angle and position of radiation reflection along each surface as radiation is reflected therefrom, thereby forming a scanning transmit path.

4. The system of claim 3 wherein rotation of the assembly varies the detector signal path so that radiation traveling along the detector signal path can sequentially include radiation reflected from multiple positions in the region to be characterized.

5. The system of claim 1 further including outgoing steering optics to direct radiation propagating along the transmit path into the target region and incoming steering optics positioned to receive reflected radiation propagating along the detector signal path and direct the reflected radiation to the mirror assembly.

6. The system of claim 1 further including an outgoing radiation optical assembly positioned along the transmit path to selectively direct radiation from reflective surfaces of the mirror assembly into the region to be characterized.

7. The system of claim 6 wherein the outgoing optical radiation assembly comprises a pair of mirrors and the source is a continuous wave laser.

8. The system of claim 1 further including an incoming signal optical assembly positioned along the relatively fixed path to direct radiation from reflective surfaces of the mirror assembly toward a detector.

9. The system of claim 8 wherein the incoming signal optical assembly comprises a pair of mirrors.

10. The system of claim 1 wherein the radiation source is a laser, the detection device is a photomultiplier tube, the mirror assembly is a hexagonal-shaped prism having a regular and symmetrical shape rotatable about a central axis with the multiple reflective surfaces positioned in planes parallel to a central axis, the system further including components for generating image data, said components including the photomultiplier tube, a focusing lens and an aperture stop, each positioned in the detector signal path.

11. The system of claim 10 further including a first folding mirror positioned in the transmit path and a second folding mirror positioned in the detector signal path, the system further including control and imaging circuitry to provide radiation scans in the target region and process signals generated by the photomultiplier tube to create image data for display or storage purposes.

12. A method for acquiring image data comprising the steps of:
   providing a mirror assembly having multiple reflective surfaces sequentially arranged to form a polygonal shape about an axis;
   rotating the mirror assembly while reflecting a beam of radiation from a first of the reflective surfaces and along a first path in a first direction to a target region, whereby a return signal may propagate along a second path in a second direction away from the target region and while reflecting a portion of the return signal from a second of the reflective surfaces of the mirror assembly and along the second path to a detector, wherein the step of reflecting the beam from the first surface creates a scanning path and the step of reflecting the portion of the return signal from the second surface creates a relatively fixed path for propagation between the mirror assembly and the detector.

13. The method of claim 12 wherein the reflective planes define a regular polygon shape with the axis centrally located within the shape, and with rotating the reflective surfaces about the axis the beam is reflected along a line on the first reflective surface to generate a sequence of reflections resulting in beam movement along a scan line in the target region.

14. The method of claim 13 wherein rotating the reflective surfaces and reflecting the portion of the return signal from the surface of the second reflective plane transforms the path of the return signal from a scanning path to a relatively fixed spatial path.

15. The method of claim 14 wherein the beam of radiation reflected from the first reflective surface propagates along a first spatially fixed path from a source to the first reflective surface and the relatively fixed spatial path is in the same plane as the first spatially fixed path.

16. The method of claim 12 wherein the step of reflecting the beam of radiation from the first reflective surface generates a scanning path for the beam and a scanning path for the portion of the return signal, and the step of reflecting the portion of the return signal from the surface of the second reflective surface generates a relatively fixed path of propagation.

17. The method of claim 16 wherein the scanning path of the beam and the scanning path of the portion of the return signal are positioned along a common plane.

18. A method for acquiring image data with and a detector comprising the steps of:
   providing a mirror assembly having multiple reflective surfaces sequentially arranged to form a polygonal shape about an axis;
   rotating the mirror assembly while reflecting a beam of radiation from a first of the reflective surfaces and along a first path in a first direction to a target region, whereby a return signal may propagate along a second path in a second direction away from the target region and while reflecting a portion of the return signal from a second of the reflective surfaces of the mirror assembly and along the second path to a detector, wherein all of the first path up to the target region is spatially separated from all portions of the second path between the target region and the detector.

* * * * *